(12) United States Patent
Han et al.

(10) Patent No.: US 11,412,879 B2
(45) Date of Patent: Aug. 16, 2022

(54) APPARATUS FOR BREWING A BEVERAGE

(71) Applicant: TEFORIA COMPANY, Mountain View, CA (US)

(72) Inventors: Allen M. Han, Mountain View, CA (US); Eric Nguyen, Santa Clara, CA (US); Jerilynn Ng, Sunnyvale, CA (US); Tsai I Hsuan, Kaohsiung (TW); Huang Wan Ting, Tainan (TW)

( * ) Notice: Subject to any disclaimer, the term of this patent is extended or adjusted under 35 U.S.C. 154(b) by 12 days.

(21) Appl. No.: 16/305,995

(22) PCT Filed: May 5, 2017

(86) PCT No.: PCT/US2017/031248
§ 371 (c)(1),
(2) Date: Nov. 30, 2018

(87) PCT Pub. No.: WO2017/192964
PCT Pub. Date: Nov. 9, 2017

(65) Prior Publication Data
US 2019/0183280 A1 Jun. 20, 2019

Related U.S. Application Data

(63) Continuation of application No. 15/147,674, filed on May 5, 2016, now abandoned.

(51) Int. Cl.
| | | |
|---|---|---|
| A47J 31/00 | (2006.01) |
| A47J 31/06 | (2006.01) |
| A47J 31/057 | (2006.01) |
| A47J 31/44 | (2006.01) |
| A47J 31/46 | (2006.01) |

(52) U.S. Cl.
CPC .......... *A47J 31/002* (2013.01); *A47J 31/057* (2013.01); *A47J 31/0615* (2013.01); *A47J 31/4478* (2013.01); *A47J 31/465* (2013.01)

(58) Field of Classification Search
CPC .... A47J 31/002; A47J 31/057; A47J 31/0615; A47J 31/4478; A47J 31/465
USPC ......... 99/275, 279, 280, 281, 282, 287, 293, 99/295, 297, 300
See application file for complete search history.

(56) References Cited

U.S. PATENT DOCUMENTS

2014/0255563 A1* 9/2014 Rondelli ............... A47J 31/407
426/115

* cited by examiner

*Primary Examiner* — Phuong T Nguyen
(74) *Attorney, Agent, or Firm* — Robinson IP Law, PLLC

(57) ABSTRACT

An infusion chamber has a top perimeter cover that defines an aperture to pass air to an air vent and receive fluid from fluid outlets. The infusion chamber has an outer chamber and an inner chamber positioned within the outer chamber, where the spacing between the outer chamber and the inner chamber defines a void. An air manifold is positioned at the base of the inner chamber. The air manifold includes air inlet channels, air exit channels and an interior solids filter. The infusion chamber also has a base housing positioned at the bottom of the infusion chamber, and a plunger positioned in the base housing to selectively evict liquid from the inner chamber.

14 Claims, 17 Drawing Sheets

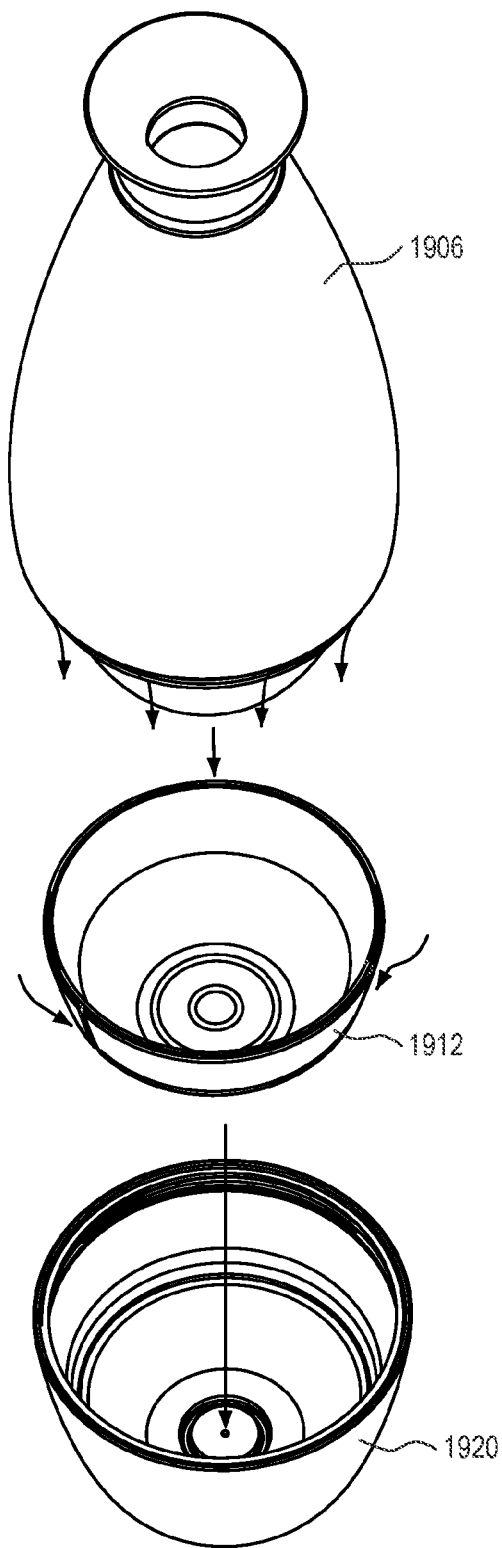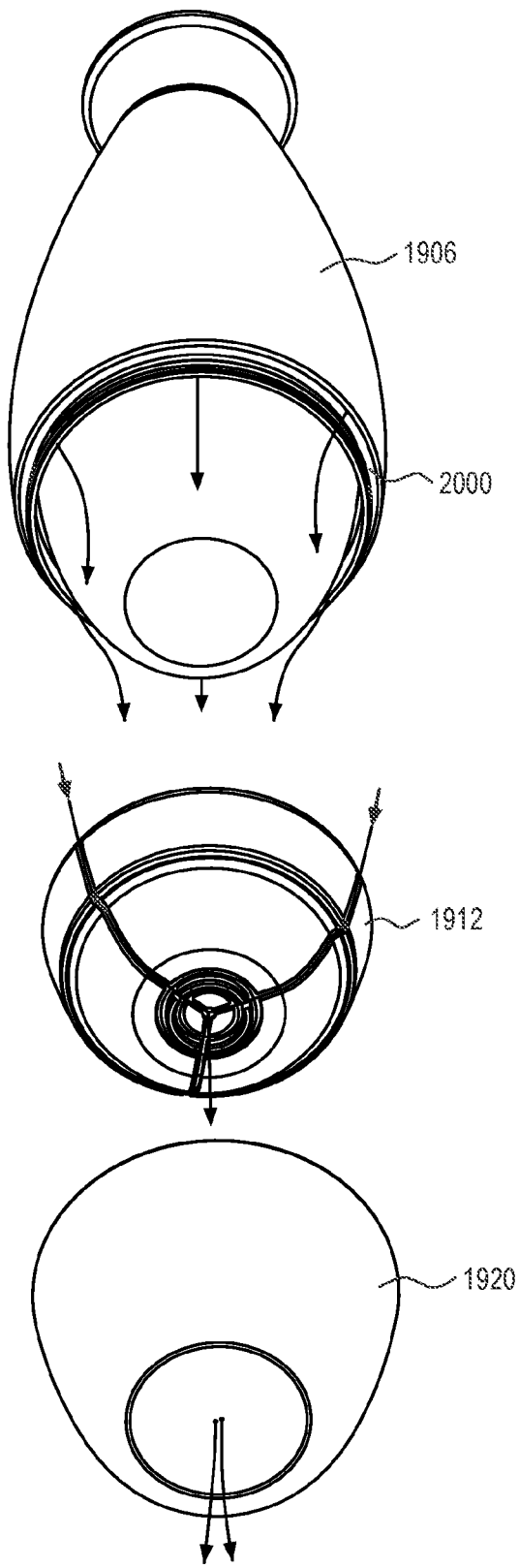
FIG. 21                    FIG. 22

APPARATUS FOR BREWING A BEVERAGE

CROSS-REFERENCE TO RELATED APPLICATIONS

This application claims priority under all applicable statutes and is a U.S. National phase application (35 U.S.C. § 371) of International Application No. PCT/US2017/031248, filed on May 5, 2017, and entitled APPARATUS FOR BREWING A BEVERAGE, which claims priority to U.S. patent application Ser. No. 15/147,674 filed on May 5, 2016, the contents of which are incorporated herein by reference in their entireties.

FIELD OF THE INVENTION

This invention relates generally to machines for preparing beverages. More particularly, this invention relates to mechanical components associated with a machine for preparing beverages.

BACKGROUND OF THE INVENTION

The assignee of the present application has two related patent applications pending, namely, Ser. No. 14/863,338, filed Sep. 23, 2015, which claims benefit to Ser. No. 14/340,520, filed Jul. 24, 2014 and Ser. No. 15/055,452, filed Feb. 26, 2016, which claims priority to Ser. No. 62/126,309, filed Feb. 27, 2015. The contents of each of those patent applications are incorporated herein by reference.

Those patent applications describe plumbing, electronic controls and mechanical features for creating a beverage through multiple course infusions. The present application is directed toward the mechanical features of a hood, infusion chamber, nest arm and carafe for use in preparing a beverage.

SUMMARY OF THE INVENTION

An apparatus has a hood with internal geometry including fluid channels to direct a fluid from a fluid inlet to fluid outlets adjacent to an outer perimeter of the hood and a bottom surface with an air vent and apertures corresponding to the fluid outlets. An infusion chamber has a top perimeter cover that defines an aperture to pass air to the air vent and receive fluid from the fluid outlets. The infusion chamber has an outer chamber and an inner chamber positioned within the outer chamber, where the spacing between the outer chamber and the inner chamber defines a void. An air manifold is positioned at the base of the inner chamber. The air manifold includes air inlet channels, air exit channels and an interior solids filter. The infusion chamber also has a base housing positioned at the bottom of the infusion chamber, and a plunger positioned in the base housing to selectively evict liquid from the inner chamber. A nest arm with a top surface supports an infusion chamber seal and a bottom surface supports a carafe seal. The infusion chamber seal and carafe seal define a common aperture to pass liquid from the inner chamber in response to the plunger selectively evicting liquid from the inner chamber.

BRIEF DESCRIPTION OF THE FIGURES

The invention is more fully appreciated in connection with the following detailed description taken in conjunction with the accompanying drawings, in which:

FIG. 21 illustrates air exit paths associated with the carafe.

FIG. 22 illustrates air exit paths associated with the carafe.

Like reference numerals refer to corresponding parts throughout the several views of the drawings.

DETAILED DESCRIPTION OF THE INVENTION

Figure 1:
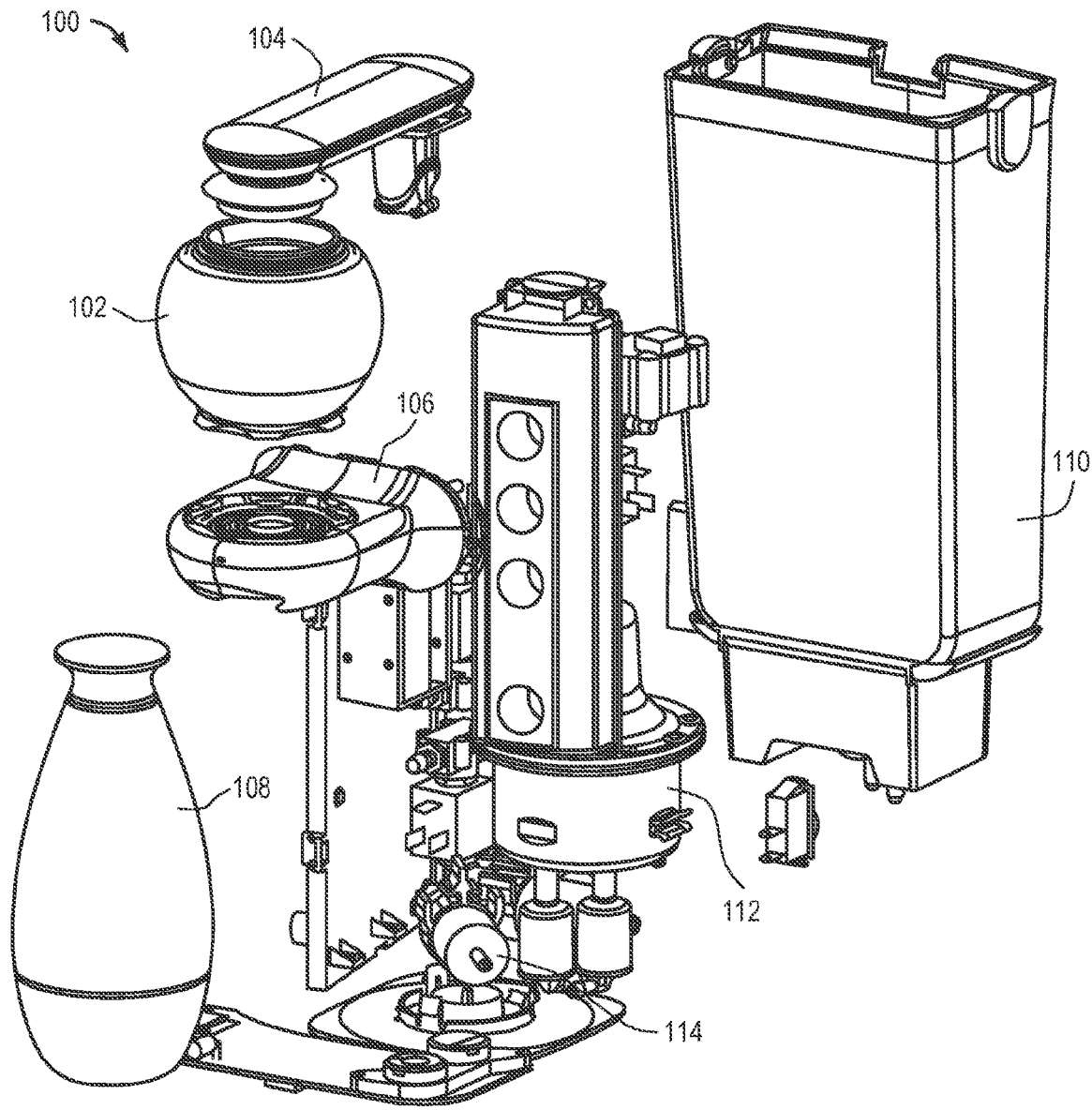
FIG. 1 is a front perspective view of a machine configured in accordance with an embodiment of the invention.

FIG. 1 is a front perspective view of a machine 100 for brewing beverages. The machine 100 includes an infusion chamber 102. The infusion chamber 102 receives solids (e.g., tea, coffee and the like), which are used to flavor a liquid that is passed through the infusion chamber 102. As described in the patent applications incorporated by reference, sequences of course infusions may be utilized to prepare highly customized and optimized beverages.

The machine 100 also includes a fluid delivery arm 104. The fluid delivery arm is a mechanical support for plumbing that delivers a fluid to the infusion chamber 102.

The infusion chamber 102 is positioned on a top surface of a nest arm 106. A carafe 108 is positioned on a bottom surface of the nest arm 106. During course infusions the infusion chamber is sealed by the nest arm 106. When course infusions are completed, the nest arm 106 opens a seal in the infusion chamber 102, allowing the fluid in the infusion chamber 102 to drain into carafe 108.

The machine 100 also includes plumbing and control components that are outside the scope of the claimed invention, but which are discussed in detail in the patent applications incorporated by reference. By way of overview, these components include a tank 110, which delivers a fluid to a heater 112. Water pump 114 may be used to coordinate this operation. Water pump 114 may also be used to deliver water from the heater 112 to the infusion chamber 102. Alternately, an air pump associated with air injectors 116 may be used to deliver water to the infusion chamber 102.

Figure 2:
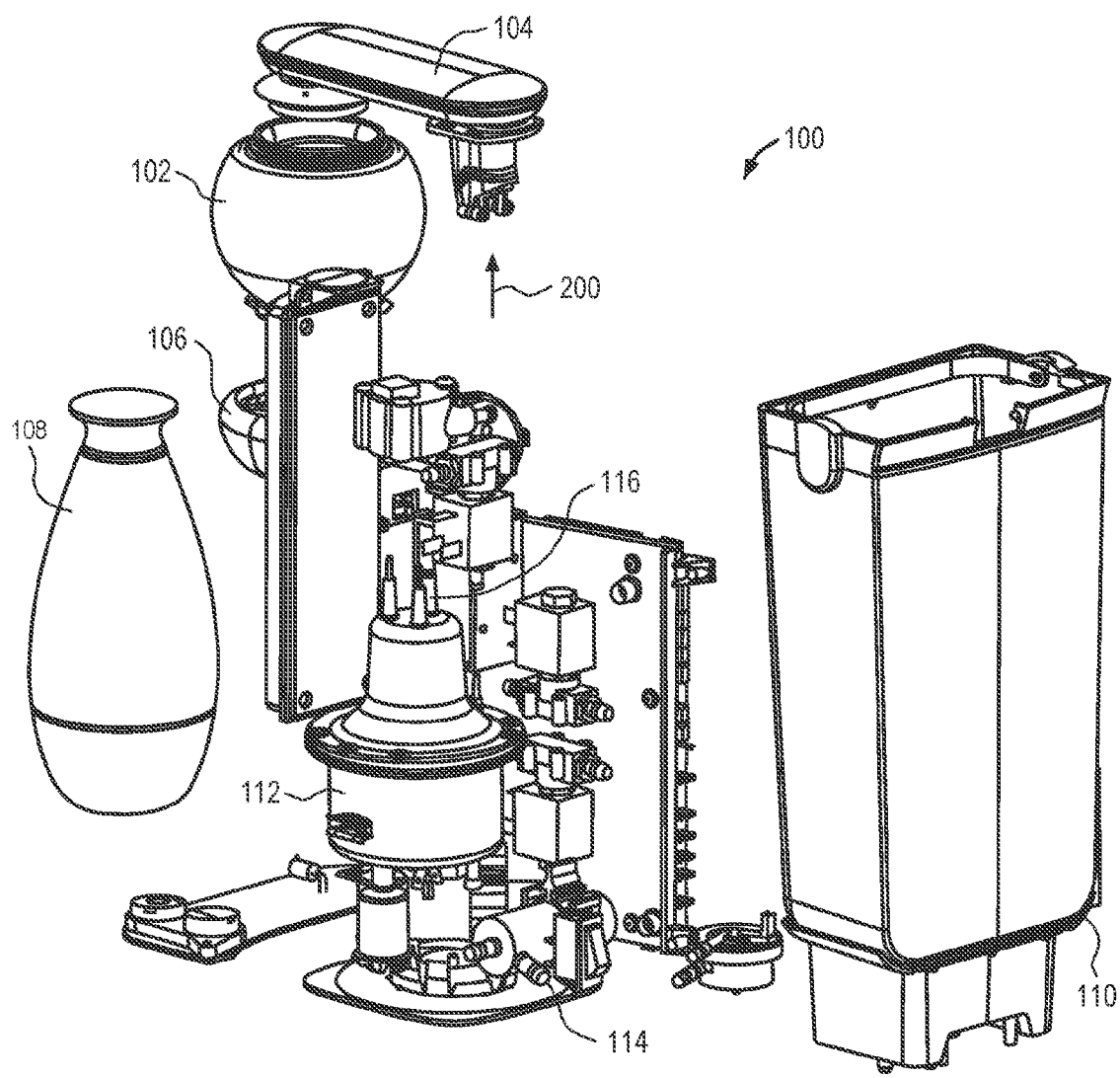
FIG. 2 is a rear perspective view of a machine configured in accordance with an embodiment of the invention.

FIG. 2 is a rear view of machine 100. The figure illustrates components discussed in connection with FIG. 1. The figure also illustrates a fluid path 200 from the heater 112 to the infusion chamber 102. The figure also illustrates air injectors 116 to inject hot air from the heater 112 into the infusion chamber 106. The combination of fluid and hot air injected into the infusion chamber 102 defines an infusion chamber course treatment.

Figure 3:
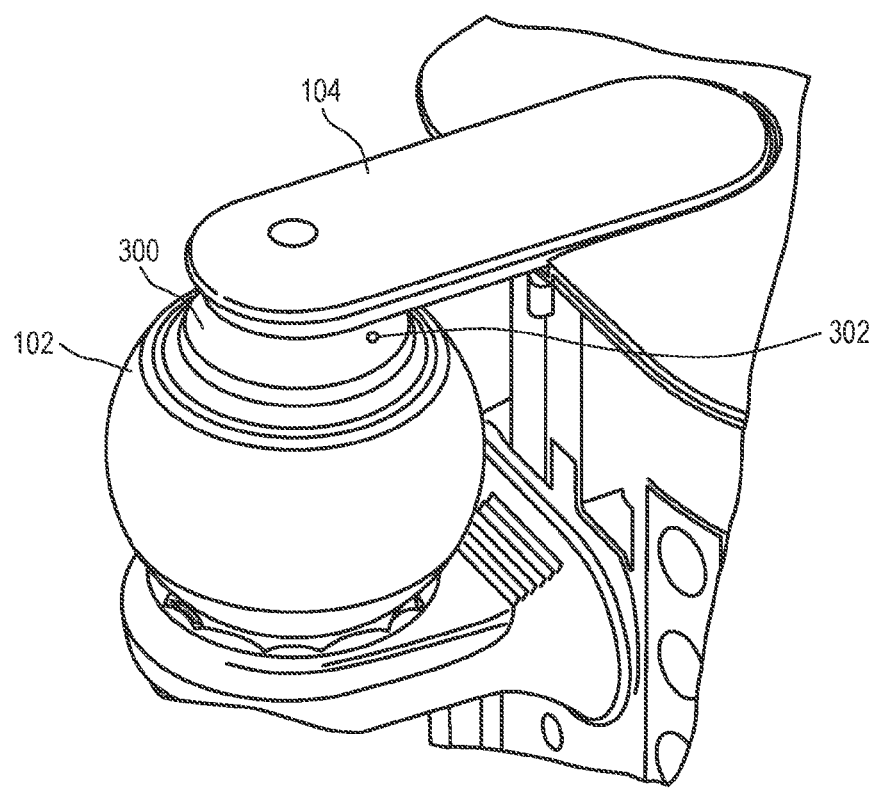
FIG. 3 is a perspective view of a fluid delivery arm, hood and infusion chamber utilized in accordance with an embodiment of the invention.

FIG. 3 illustrates the fluid delivery arm 104. A hood 300 is positioned at the end of the fluid delivery arm. The hood 300 is an interface to the infusion chamber 102, as detailed below.

Figure 4:
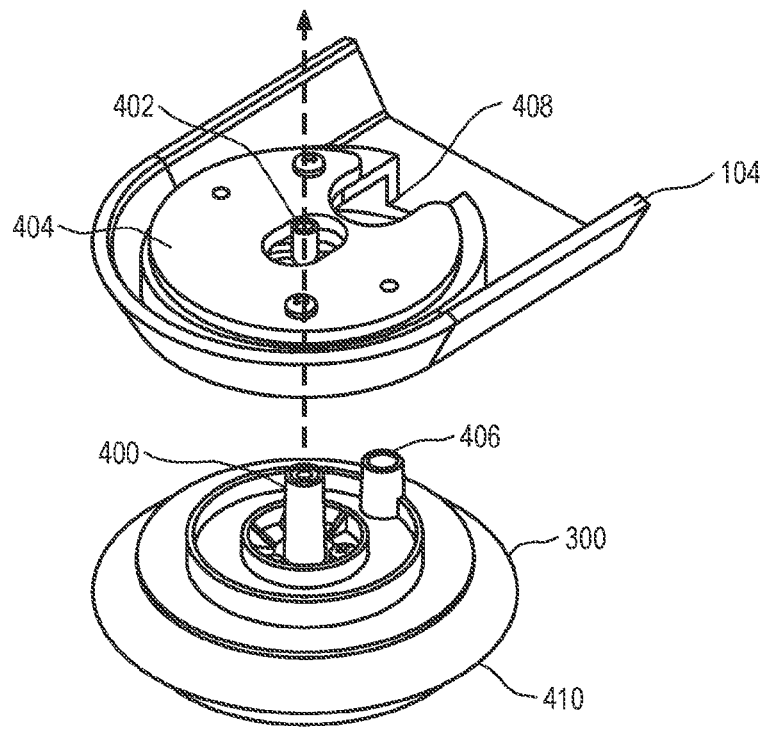
FIG. 4 illustrates components for connecting the hood to the fluid delivery arm.

FIG. 4 illustrates hood 300 with a hood screw boss 400. The hood 300 also includes a fluid inlet, which is in fluid communication with a fluid source delivered through fluid delivery arm 104. The fluid delivery arm 104 may include an arm screw boss 402 to establish a mechanical connection between the fluid delivery arm 104 and the hood 300. A plate 404 may also be used to support the mechanical link and allow positional calibration of the hood 300. The plate 404 includes a cut-out 408 to accommodate the fluid inlet 406.

Figure 5:
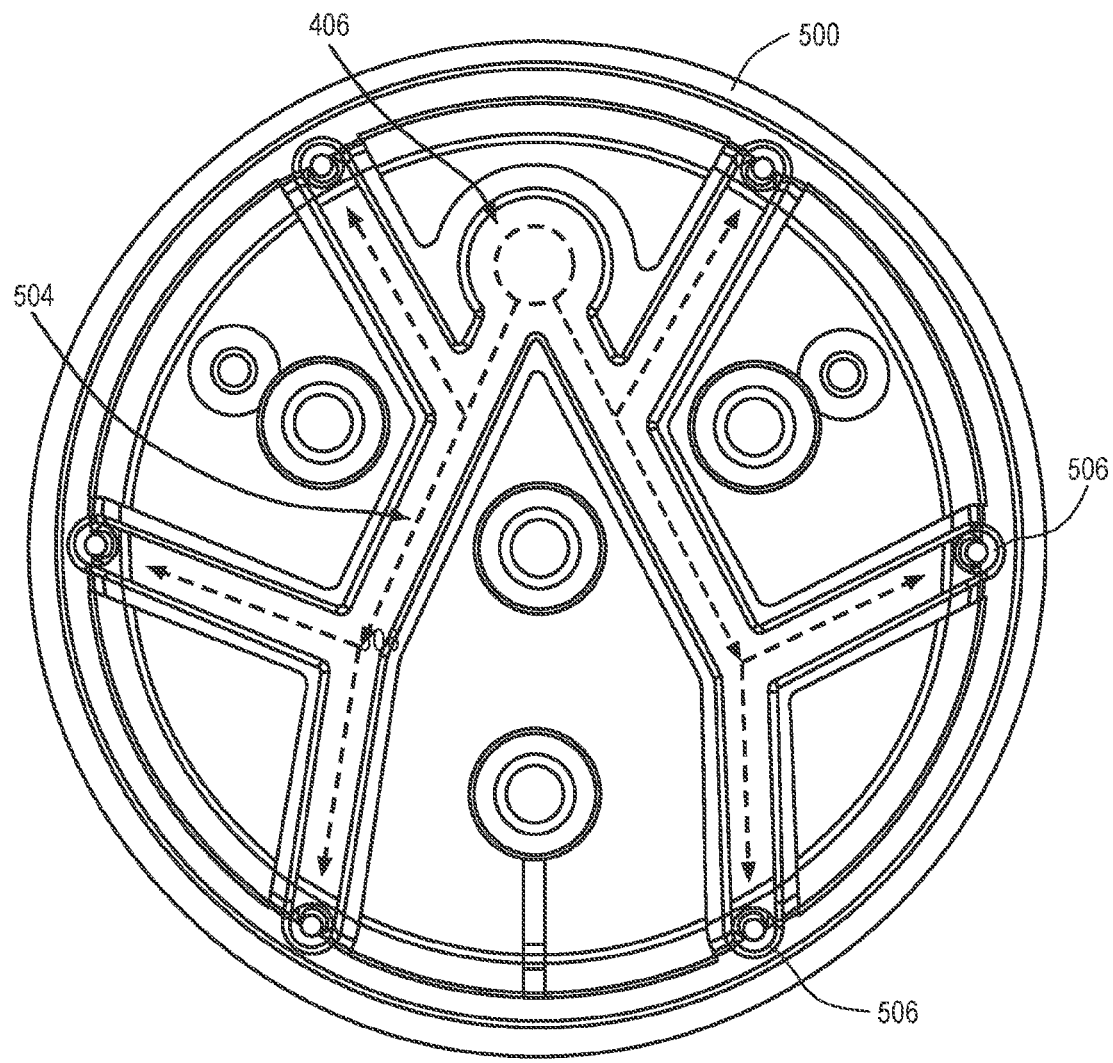
FIG. 5 is a top view of the bottom of the hood.

FIG. 5 illustrates top view of the hood bottom 500. The hood bottom 500 is connected to the fluid inlet 406 and includes fluid channels 504 that terminate in fluid outlets 506 adjacent to the outer perimeter of the hood. Cover 410 in FIG. 4 rests over the hood bottom 500 of FIG. 5. Cover 410 includes an aperture 302, shown in FIG. 3, to vent air from the infusion chamber 102. Thus, aroma from the infusion chamber 102 is released during the brewing process. Further, the aperture 302 draws air into the infusion chamber when the contents of the infusion chamber are drained into the carafe.

Figure 6:
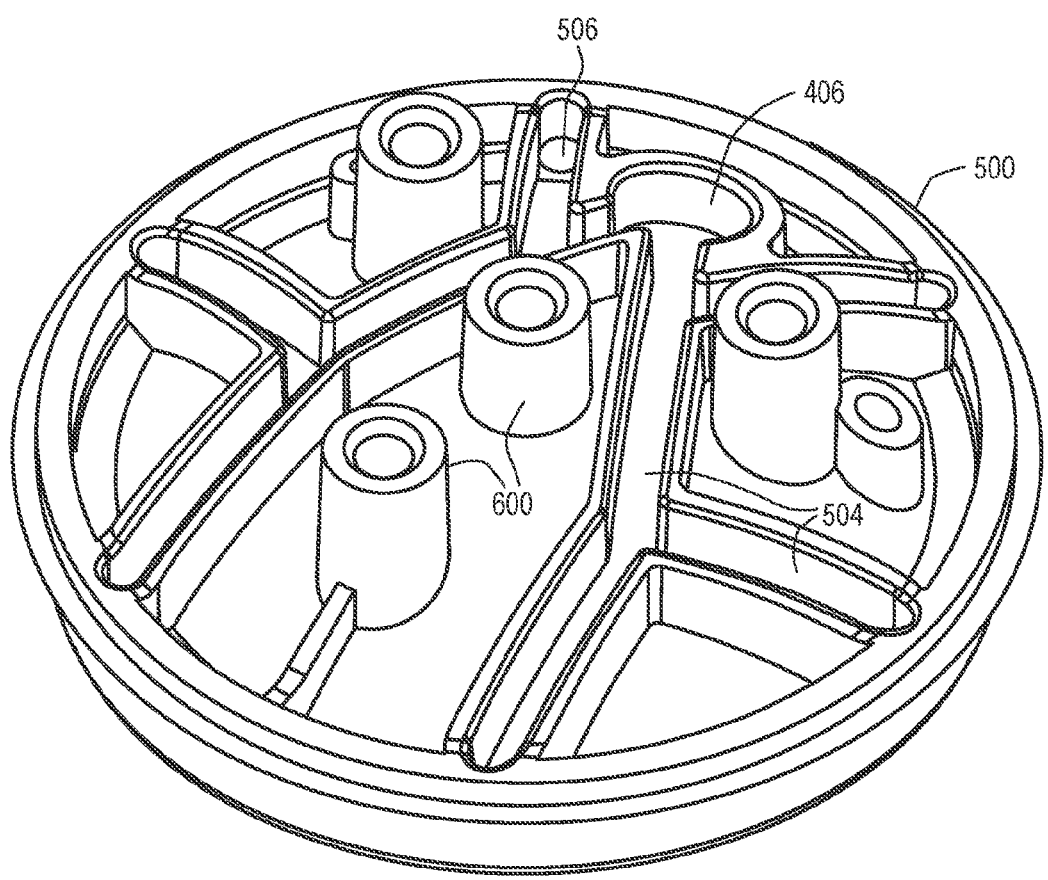
FIG. 6 is a perspective view of the bottom of the hood.

FIG. 6 is a perspective view of the hood bottom 500, showing fluid inlet 406, fluid channels 504 and fluid outlets 506. The figure also illustrates screw bosses 600.

Figure 7:
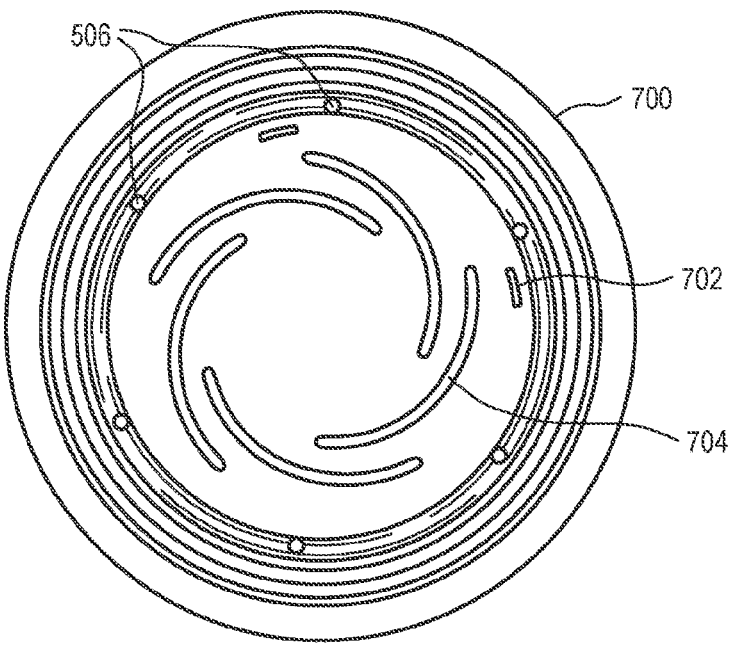
FIG. 7 is view of the bottom surface of the hood.

FIG. 7 illustrates a hood bottom surface 700. The hood bottom surface 700 interfaces with the infusion chamber 102. The hood bottom surface 700 includes an air vent 702 to vent air from the infusion chamber 102 through the vent 302 shown in FIG. 3. The figure also illustrates fluid outlets 506, which span from the top surface of hood bottom 500 to the hood bottom surface 700. An embodiment of the bottom surface may include vanes 704, operative for controlling condensation, such that it drips adjacent to the center of the infusion chamber and away from the outer perimeter of the infusion chamber.

Figure 8:
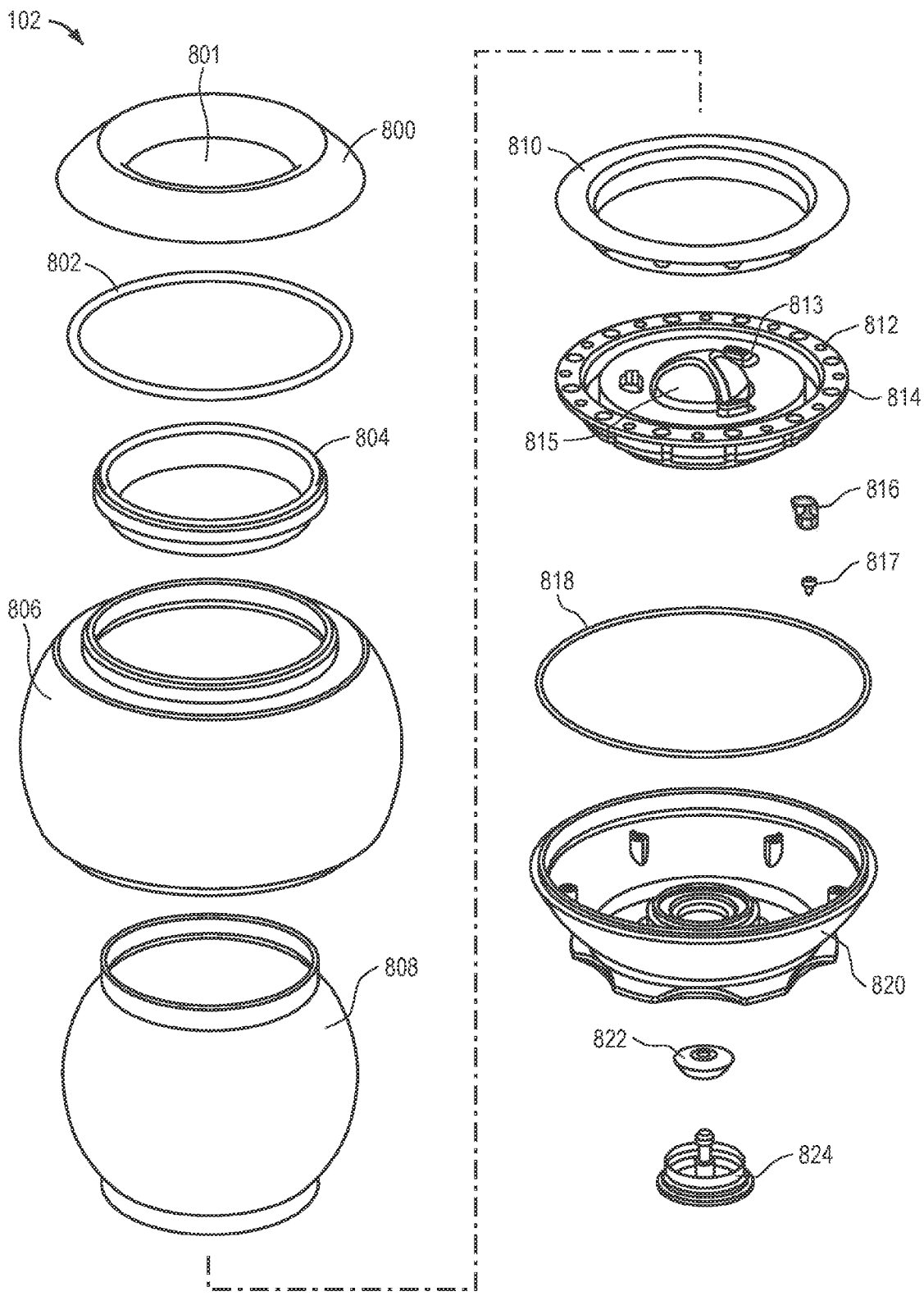
FIG. 8 is an exploded view of components of an infusion chamber configured in accordance with an embodiment of the invention.

FIG. 8 is an exploded view of components associated with an embodiment of the infusion chamber 102. The infusion chamber 102 includes a top perimeter cover 800. The top perimeter cover 800 engages the bottom surface 700 of the hood. The top perimeter cover defines an aperture 801 to pass air to the air vent 702 of the hood and to receive fluid from the fluid outlets 506.

The infusion chamber 102 also has a seal ring 802 and an outer chamber top seal 804. An outer chamber 806 encases an inner chamber 808. The spacing between the outer chamber 806 and the inner chamber 808 defines a void 905, shown in FIG. 9. The inner chamber 808 may be glass. The outer chamber 806 is operative as a protective layer, for example, formed of plastic. The dual-chamber configuration provides thermal insulation and maintains the outer chamber 806 at a safe temperature.

A resilient cover 810 (e.g., formed of silicone) is positioned between the inner chamber 808 and an air manifold 812. The air manifold 812 includes air inlet channels 813, air exit channels 814 and an interior solids filter 815. A valve holder 816 encases a valve 817. The valve 817 vents air from the void 905, as illustrated in subsequent figures. A seal ring 818 is positioned over a base housing 820. The base housing 820 is attached to a plunger seal 822 and a plunger 824. Activation of the plunger 824, as discussed below, allows the beverage within the inner chamber 808 to be drained into the carafe 108.

Figure 9:
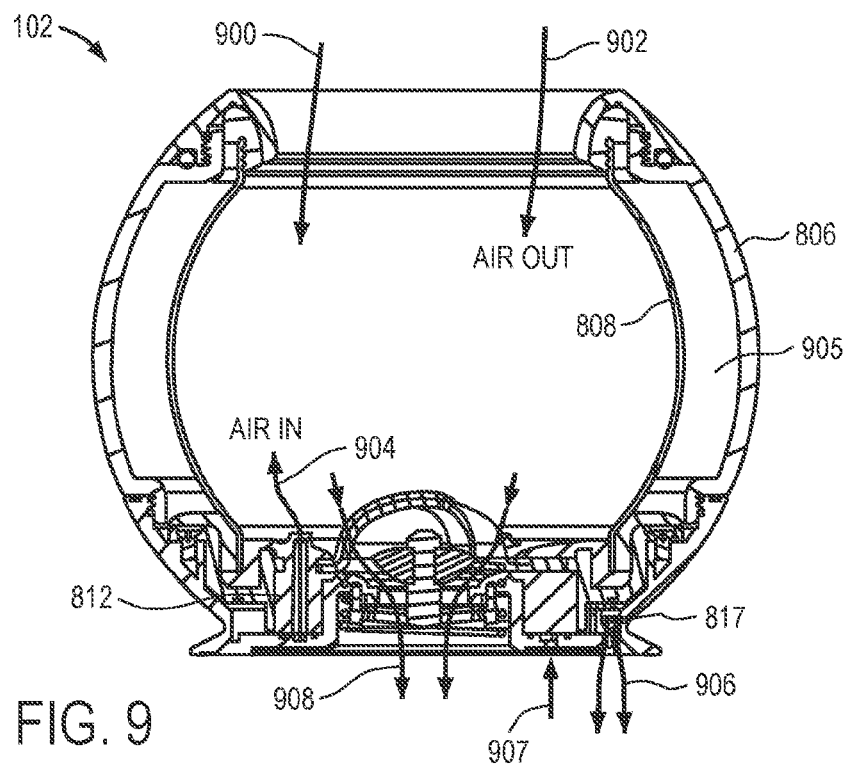
FIG. 9 is a side cross-sectional view of an infusion chamber configured in accordance with an embodiment of the invention.

FIG. 9 is a cross-sectional view of the infusion chamber 102. Arrow 900 shows the fluid-in path from the hood 300. Arrow 902 shows the air out path to the hood 300. An air-in path 904 from the nest arm 106 is through a channel in the air manifold 812. An air-in path 907, also from the nest arm 106, may be used to agitate the contents within solids filter 815. An air-out path 906 vents air from void 905 through valve 817. Finally, path 908 illustrates a beverage-out path when the plunger is engaged.

Figure 10:
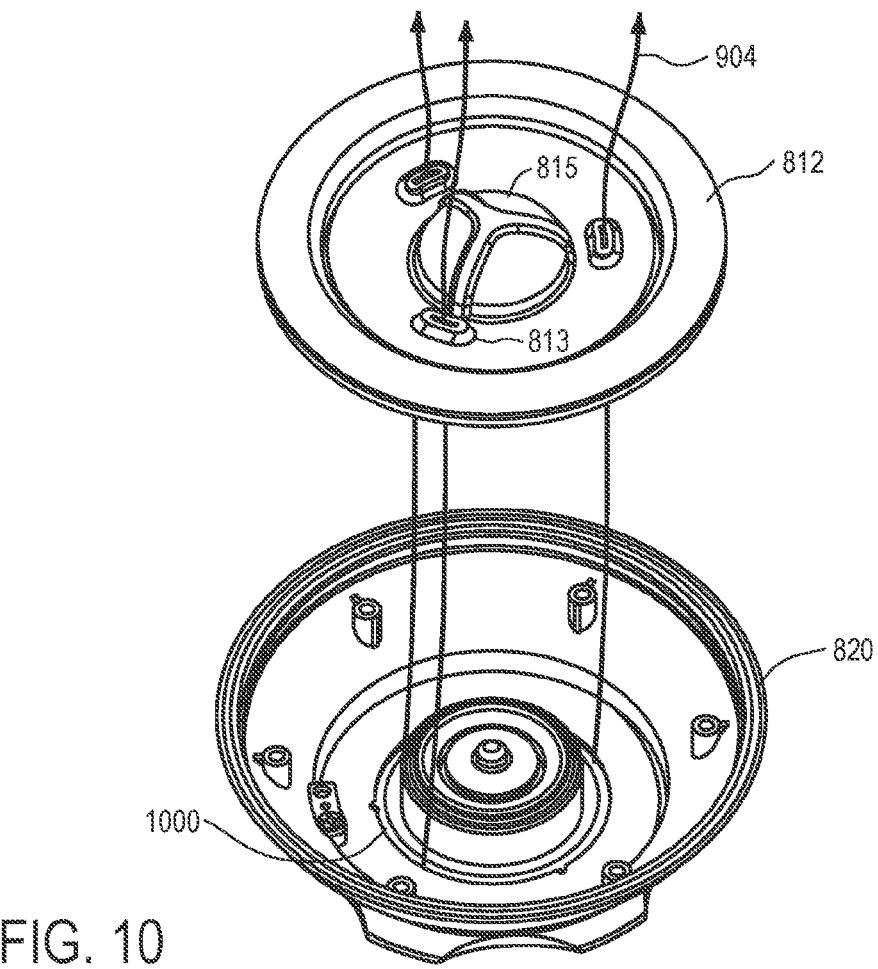
FIG. 10 illustrates an air manifold utilized within the infusion chamber.

FIG. 10 illustrates air-in paths 904 through apertures 813. In one embodiment, the apertures 813 have a duck-bill shape. Apertures 813 form concentric air inlet channels surrounding the interior solids filter 815. An air inlet channel 1000 receives air from air injectors 116.

Figure 11:
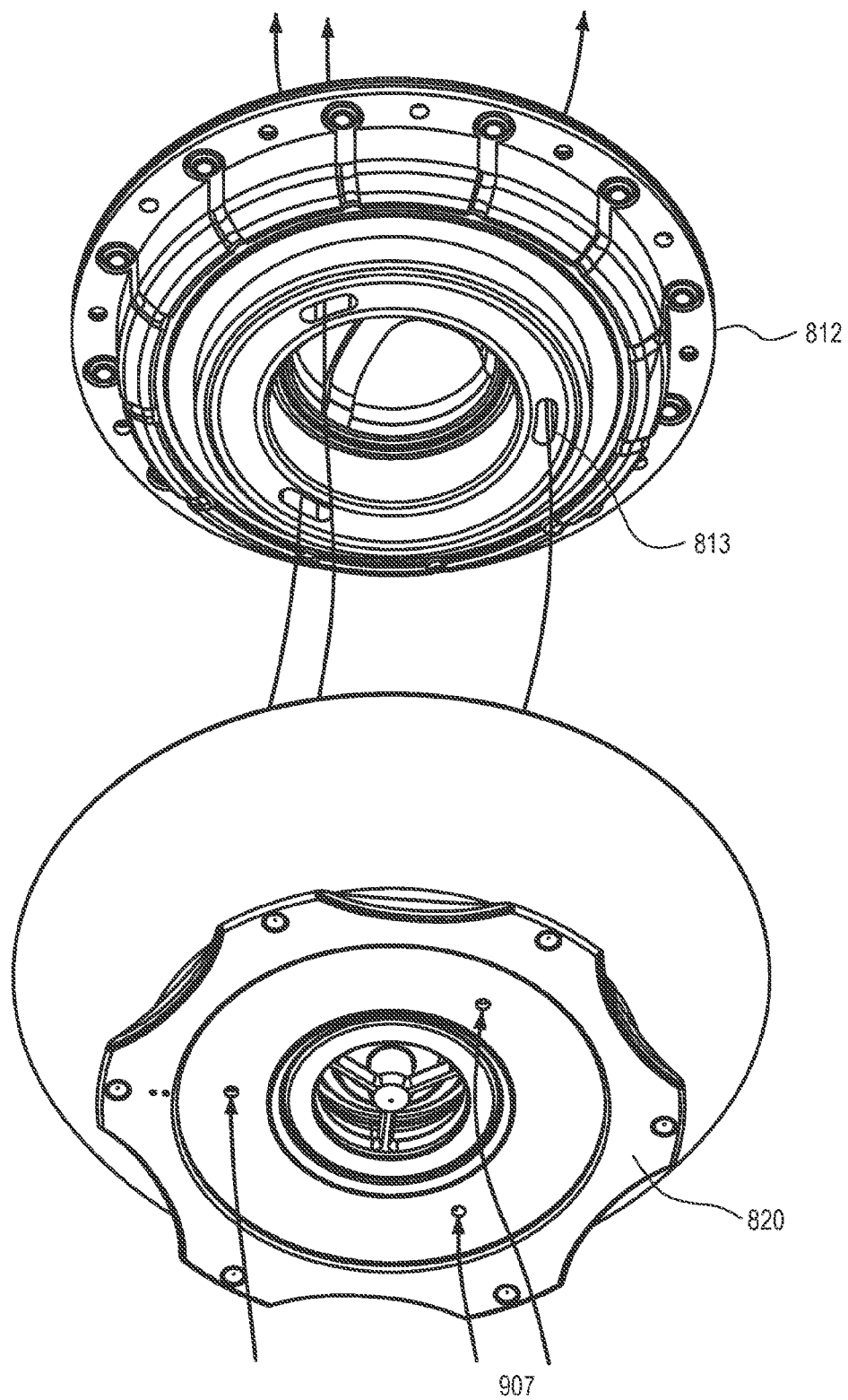
FIG. 11 is a bottom view of the air manifold utilized within the infusion chamber.

FIG. 11 illustrates the bottom of base housing 820. Paths 907 illustrate air input from air injectors 116 via nest arm 106. The figure illustrates the air path through air channels 813 of air manifold 812.

Figure 12:
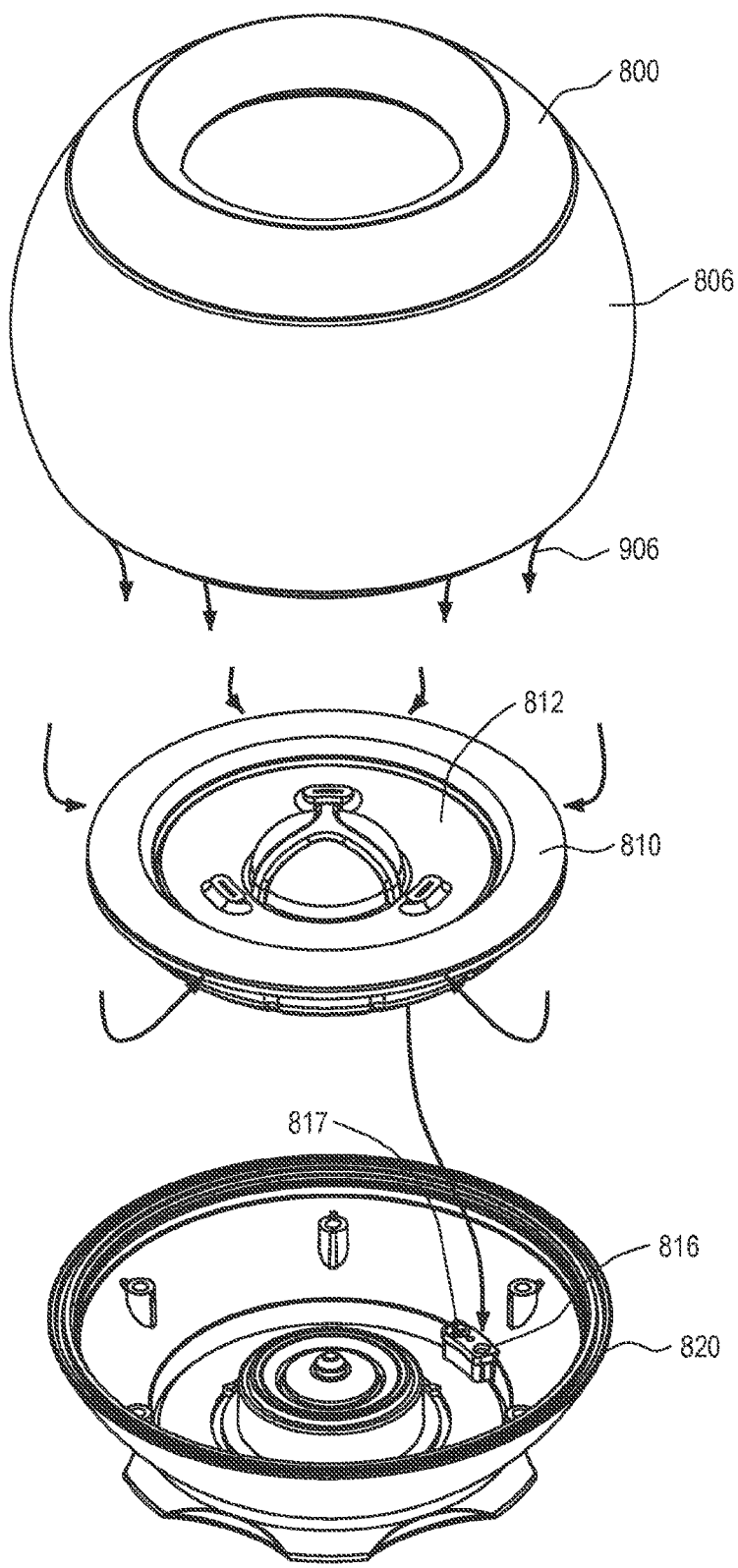
FIG. 12 illustrates air exit paths associated with the infusion chamber.
Figure 13:
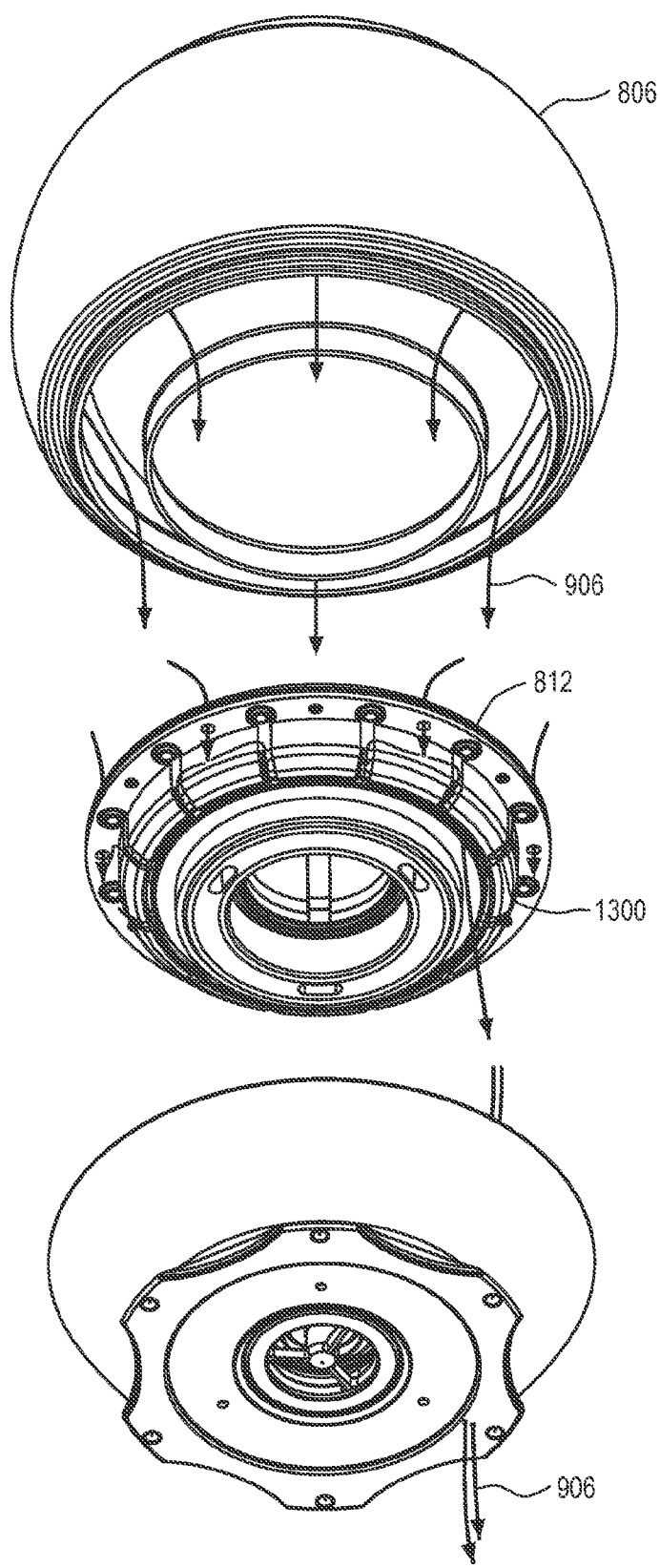
FIG. 13 illustrates air exit paths through the air manifold.

FIG. 12 illustrates air-out path 906. Air from the void 905 migrates under seal 810 to channels in the air manifold 812. The air passes through valve 817 positioned in valve holder 816. The air-out path 906 is more fully appreciated with reference to FIG. 13. FIG. 13 illustrates air-out channels 1300 formed within the bottom side of air manifold 812. Air is evicted from the void when the air pressure in the void is higher than the ambient pressure.

Figure 14:
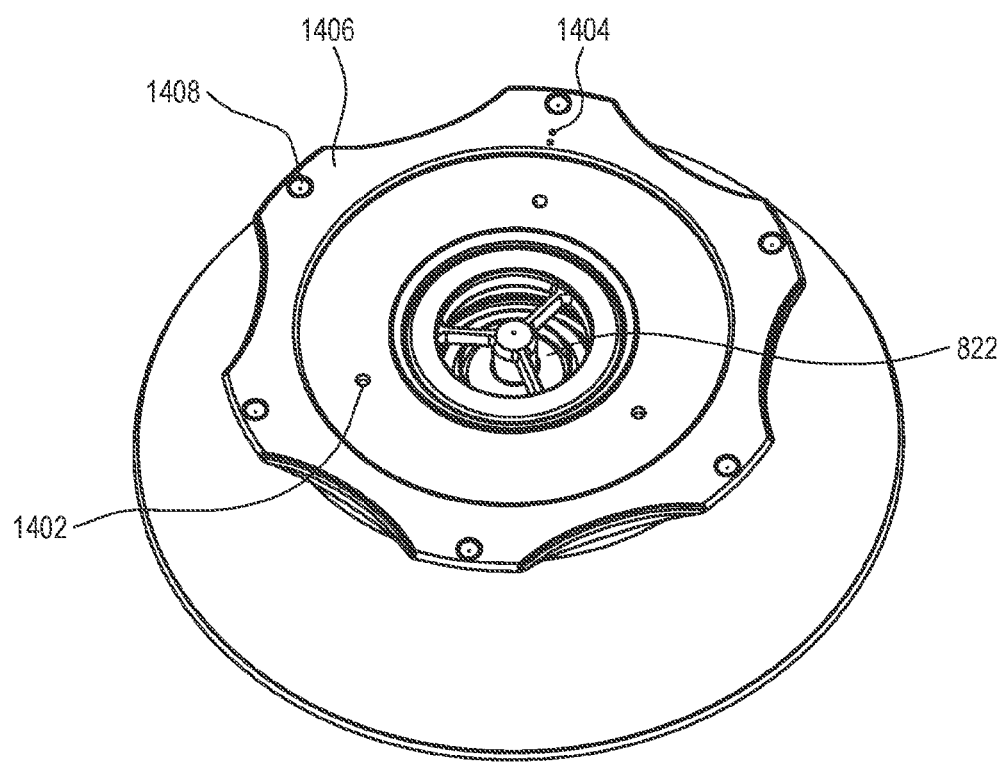
FIG. 14 is a bottom view of the infusion chamber.

FIG. 14 illustrates the bottom of the infusion chamber. In particular, the figure illustrates plunger seal 822. The figure illustrates injected air inlets 1402 to receive air from air injectors 116 via the nest arm 106. The figure also illustrates an air output vent 1404 to emit air released by valve 817. A plate 1406 is at the bottom of the base housing 820. The plate 1406 is affixed via plate screws 1408.

Figure 15:
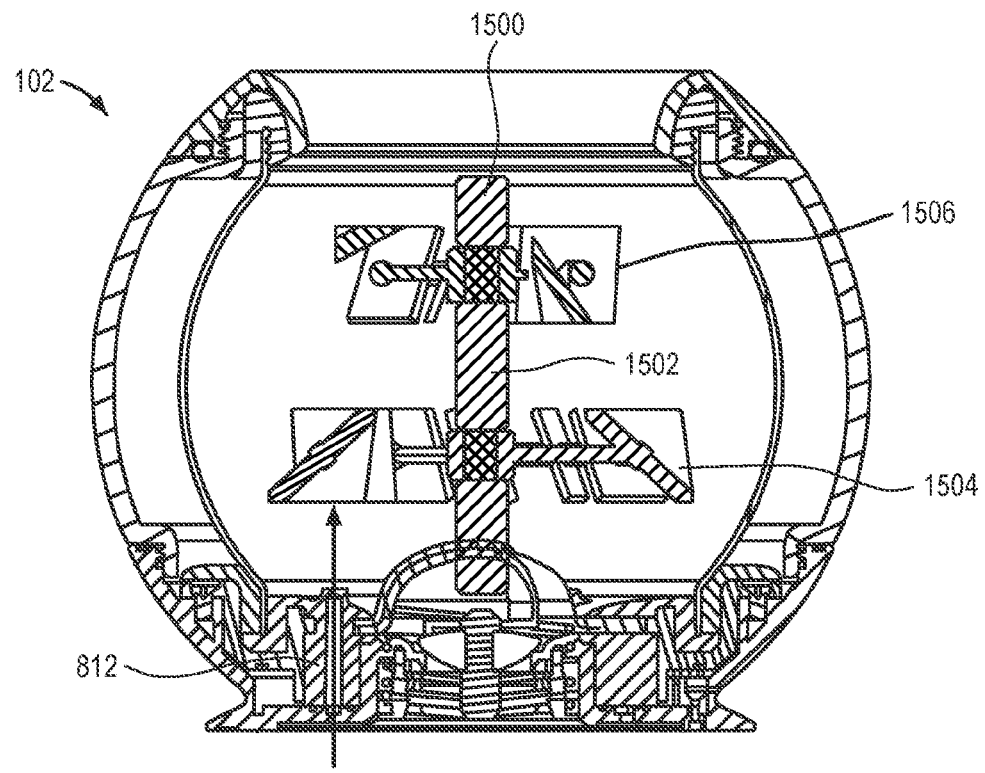
FIG. 15 is a side view of a wheel whisk utilized within the infusion chamber in accordance with an embodiment of the invention.

FIG. 15 illustrates the infusion chamber 102 containing a wheel whisk 1500. The wheel whisk has an axle 1502 with a first paddle row 1504 and a second paddle row 1506 axially offset from the first paddle row 1504. The first paddle row is configured to spin in a first direction (e.g., clockwise) and the second paddle row is configured to spin in a second direction (e.g., counter-clockwise) opposite the first direction. Air from air manifold 812 hits paddles of the first paddle row 1504; this causes the first paddle row 1504 to spin. The air continues to the second paddle row 1506, causing the second paddle row 1506 to spin in the opposite direction. The wheel whisk 1500 creates turbulence to break up solids (e.g., tea leaves) that may be used in forming a beverage. The paddles of first paddle row 1504 are angled inward to direct air towards the smaller diameter second paddle row 1506.

Figure 16:
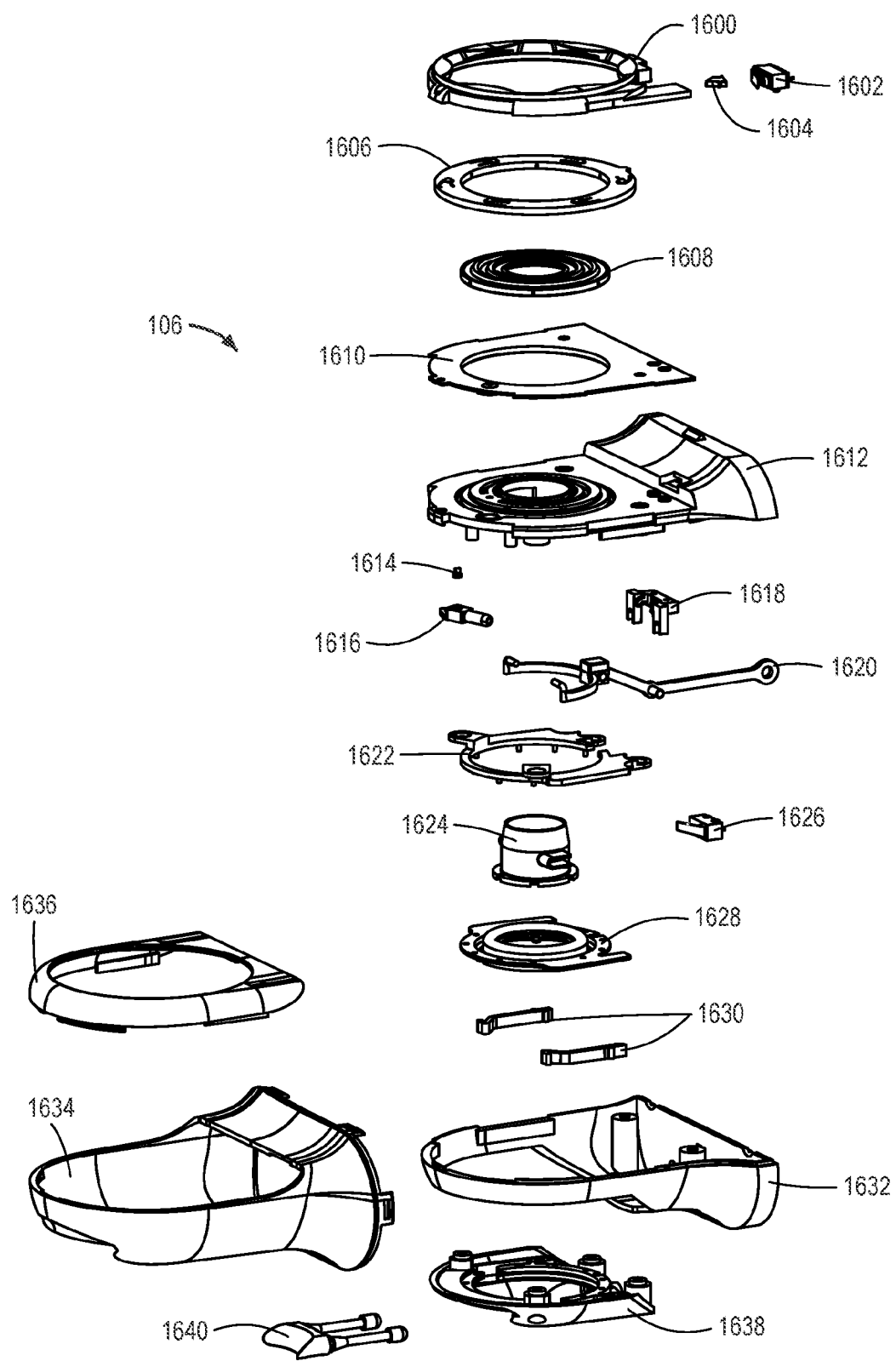
FIG. 16 is an exploded view of components associated with the nest arm.

FIG. 16 is an exploded view of components associated with the nest arm 106. A lock cover 1600 hosts an infusion chamber detector 1602. Detection of an infusion chamber may initiate operation of the brewing machine. The lock cover 1600 may also host a plunger detector 1604. A lock plate 106 is positioned under the lock cover 1600. Seal 1608 includes air channels to diffuse air through air inlets 1402 of the infusion chamber 102. A resilient seal (e.g., silicone) 1610 rests on an interior nest arm top surface 1612. A valve 1614 is positioned in fixture 1616. A clamp 1618 holds seesaw 1620. A seal baffle plate 1622 rests on carafe seal 1628. A lifter 1624 is positioned in the seesaw 1620. The lifter 1624 provides for physical movement of the plunger seal 822. In particular, a solenoid or motor pulls the seesaw 1620 down, which moves the lifter 1624 up, causing the plunger seal 822 to open.

Component 1626 is an electronic carafe detector. Carafe snaps 1630 register a carafe in a proper position. Component 1632 is a nest arm base, which is covered by nest arm housing 1634, which holds a nest arm cap 1636. A plate bottom 1638 holds a mechanical carafe detector 1640.

Figure 17:
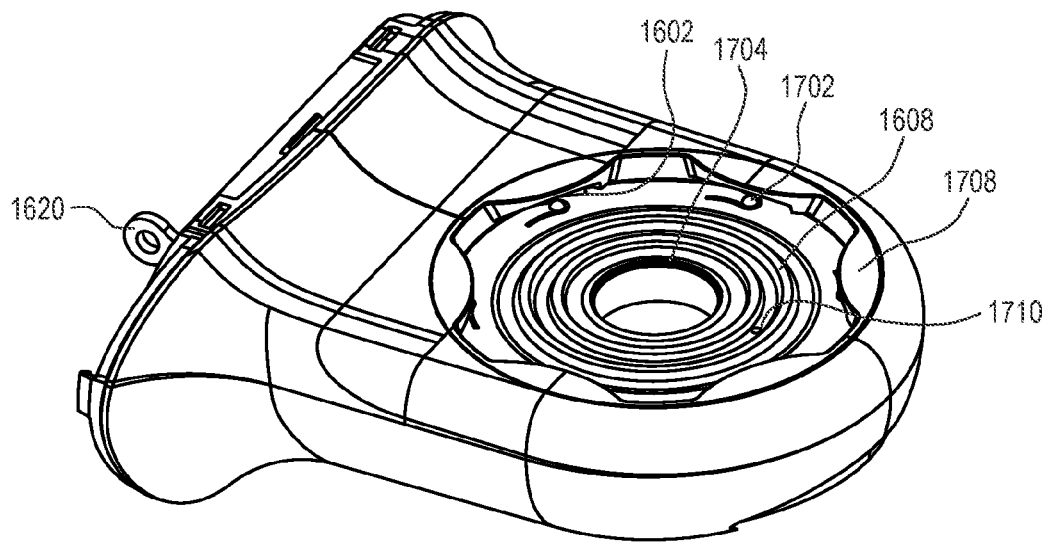
FIG. 17 is a perspective view of top surface components associated with the nest arm.

FIG. 17 illustrates the top of assembled nest arm 106. The figure illustrates infusion chamber detector 1602. The figure also illustrates an infusion chamber lock features 1702. The lock features 1702 may be formed on lock plate 1606. The features 1702 register the infusion chamber in a proper position. This is accomplished by rotating the infusion chamber to engage the lock features 1702.

The figure also illustrates a lifter seal 1704 and an infusion chamber seal 1608. Component 1708 is a lock plate. Also illustrated is an air outlet 1710 to vent air evicted from the infusion chamber void. Finally, the figure illustrates seesaw 1620.

Figure 18:
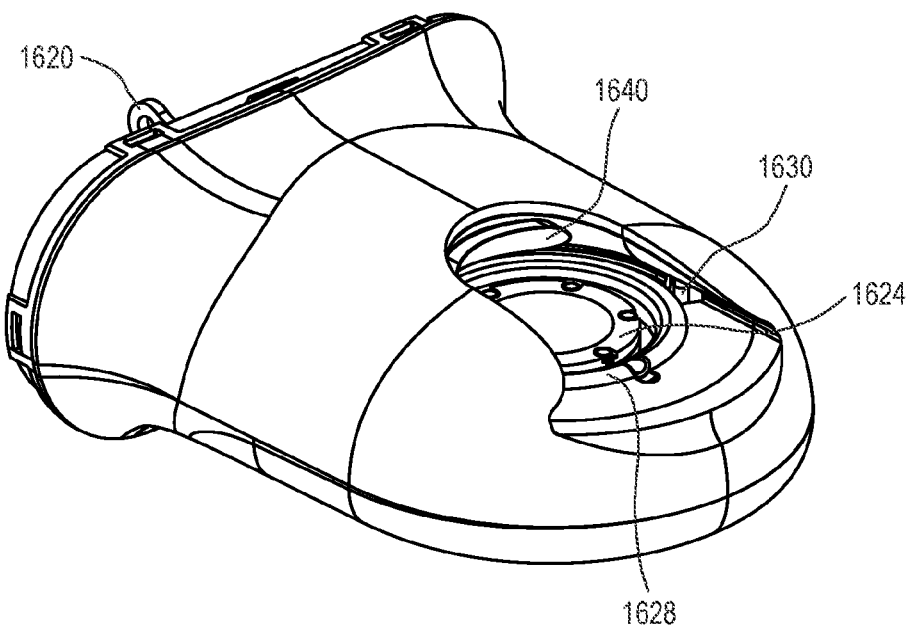
FIG. 18 is a perspective view of bottom surface components associated with the nest arm.

FIG. 18 illustrates the bottom of the assembled nest arm 106. The figure illustrates the mechanical carafe detector 1640, carafe snaps 1630 and plunger 1624. The figure also illustrates carafe seal 1628.

Figure 19:
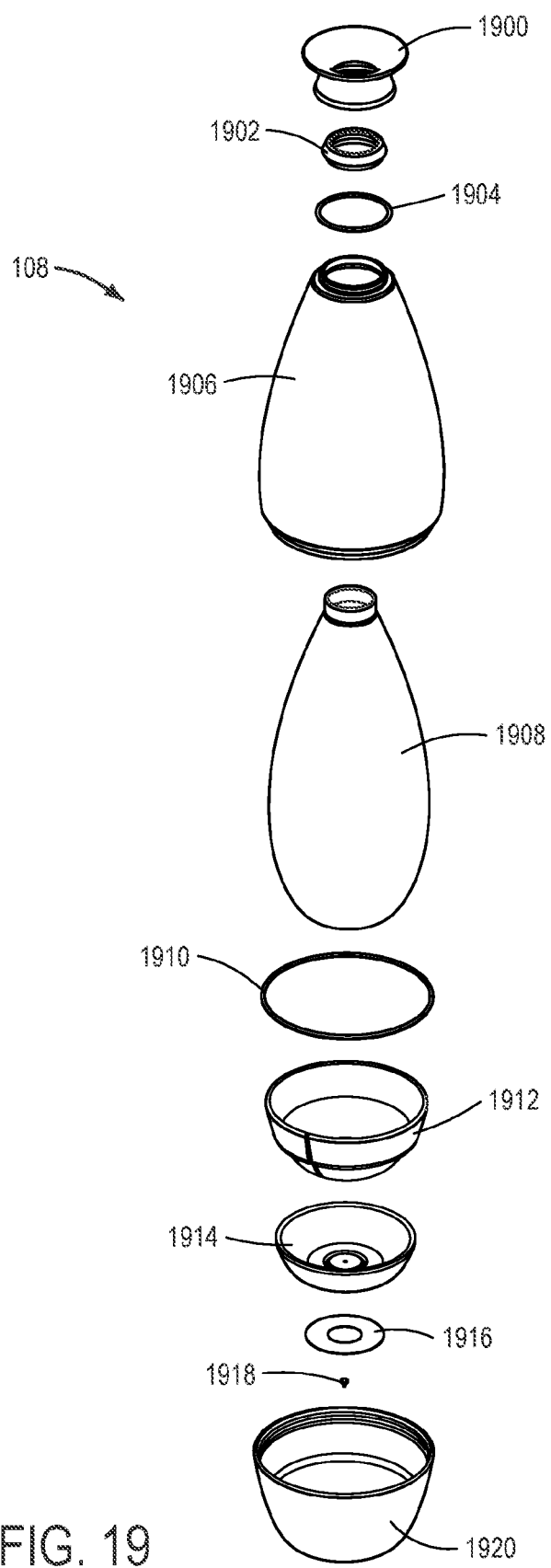
FIG. 19 is an exploded view of components associated with a carafe configured in accordance with an embodiment of the invention.

FIG. 19 is an exploded view of components associated with a carafe 108. A top cover 1900 has a carafe inner chamber top seal 1902 and seal ring 1904. A carafe outer chamber 1906 encases a carafe inner chamber 1908. The spacing between the carafe outer chamber 1906 and the carafe inner chamber 1908 defines a carafe void, shown as element 2000 in FIG. 20. A seal ring 1910 is positioned over air channel fitting 1912. Element 1914 is a counterweight. Element 1916 is a washer, element 1918 is a valve and element 1920 is a bottom cover.

Figure 20:
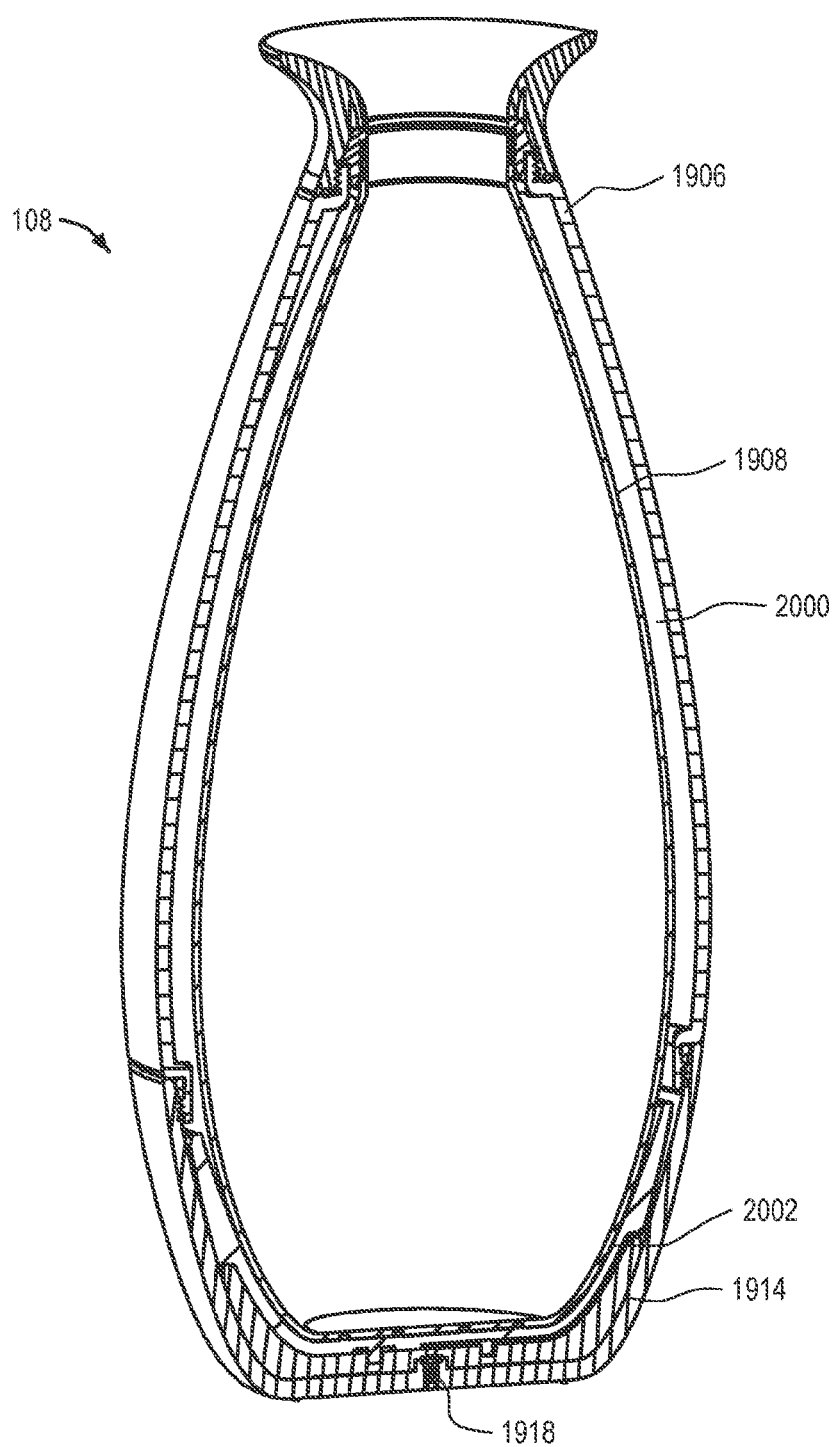
FIG. 20 is a side cross-sectional view of a carafe configured in accordance with an embodiment of the invention.

FIG. 20 is a cross sectional view of the carafe 108. Air channel fitting 1912 has a channel 2002 that leads to valve 1918. This allows air to be vacated from carafe void 2000 when the pressure in the void is higher than ambient pressure. The double layer design provides thermal insulation and protects a user from excessive temperatures.

Figure 23:
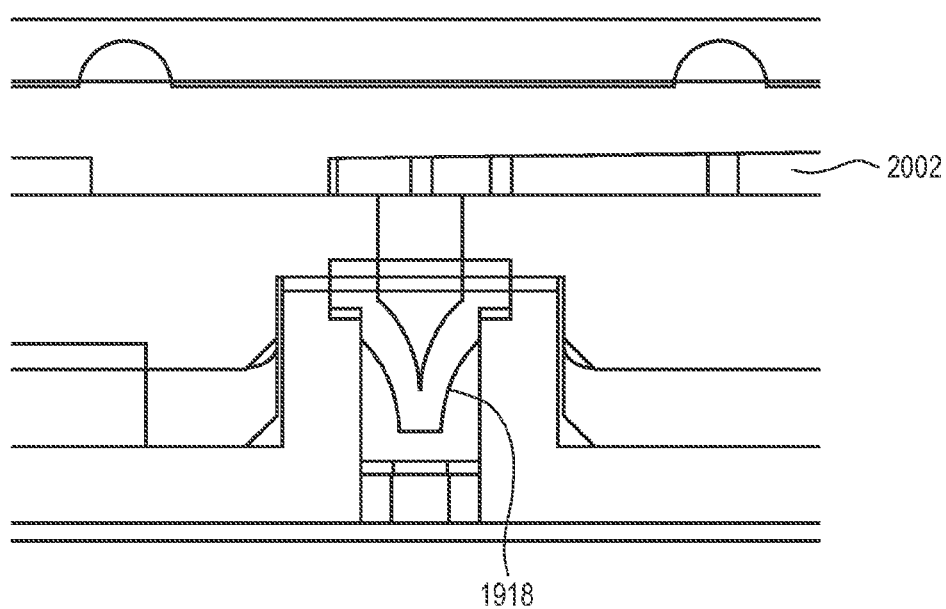
FIG. 23 illustrates a valve utilized within the carafe for air exit.

FIGS. 21 and 22 illustrate the air exit path associated with the carafe 108. FIG. 23 is a detailed depiction of the valve 1918 linked to air channel 2002. The valve 1918 is preferably configured for one-way eviction of air from the void 2000. The valve 817 of the infusion chamber may have a similar configuration and support structure.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for brewing a beverage, the apparatus comprising:
   a hood with a top surface including fluid channels to direct a fluid from a fluid inlet to a plurality of fluid outlets adjacent to an outer perimeter of the hood and a bottom surface with an air vent and apertures corresponding to the plurality of fluid outlets;
   an infusion chamber comprises
      a top perimeter cover for engagement with the bottom surface of the hood, the top perimeter cover defining an aperture to pass air to the air vent and receive fluid from the plurality of fluid outlets,
      an outer chamber,
      an inner chamber positioned within the outer chamber, wherein the spacing between the outer chamber and the inner chamber defines a void,
      an air manifold positioned at the base of the inner chamber, the air manifold including air inlet channels, air exit channels and an interior solids filter,
      a base housing positioned at the bottom of the infusion chamber, and
      a plunger positioned in the base housing to selectively evict liquid from the inner chamber; and
   a nest arm with a top surface supporting an infusion chamber seal and a bottom surface supporting a carafe seal, the infusion chamber seal and carafe seal defining a common aperture to pass liquid from the inner chamber in response to the plunger selectively evicting liquid from the inner chamber.

2. The apparatus of claim 1 wherein the hood is positioned at the end of a fluid delivery arm.

3. The apparatus of claim 1 wherein the air manifold receives pumped air at the air inlet channels.

4. The apparatus of claim 3 wherein the air inlet channels form concentric apertures surrounding the interior solids filter.

5. The apparatus of claim 1 wherein the air manifold includes an air exit channel with a valve to evict air from the void.

6. The apparatus of claim 1 further comprising a wheel whisk positioned within the inner chamber, the wheel whisk comprising an axle, a first paddle row connected to the axle and a second paddle row connected to the axle offset and axially offset from the first paddle row, the first paddle row configured to spin in a first direction and the second paddle row configured to spin in a second direction opposite the first direction.

7. The apparatus of claim 1 wherein the nest arm further comprises a lock cover supporting an infusion chamber detector.

8. The apparatus of claim 7 further comprising a lock plate connected to the lock cover, the lock plate including a physical feature to register the infusion chamber in a proper position.

9. The apparatus of claim 1 wherein the nest arm further comprises a carafe detector.

10. The apparatus of claim 1 wherein the nest arm further comprises carafe snaps to register a carafe in a proper position.

11. The apparatus of claim 1 further comprising a carafe attached to the bottom surface of the nest arm.

12. The apparatus of claim 1 wherein the carafe includes a carafe outer chamber and a carafe inner chamber, wherein the spacing between the carafe outer chamber and the carafe inner chamber defines a carafe void.

13. The apparatus of claim 12 further comprising an air channel fitting in fluid communication with the carafe void.

14. The apparatus of claim 13 the air channel fitting includes an air exit channel with a valve to evict air from the carafe void.

* * * * *